UNITED STATES PATENT OFFICE

1,977,768

PROCESS FOR MANUFACTURING PERYLENE

Friedrich Kuhrmann, Dessau in Anhalt, Germany, assignor to General Aniline Works, Inc., New York, N. Y., a corporation of Delaware No Drawing. Application September 22, 1933, Serial No. 690,634. In Germany June 8, 1932

3 Claims. (Cl. 260—168)

My present invention relates to an improved process for manufacturing perylene and more particularly to such a process in which 2,2'-dinaphthyl is used as a starting material.

2,2'-dinaphthyl is obtainable on a technical scale by dehydrogenating naphthalene and thus it becomes possible by my new process to produce likewise perylene in a technical rate.

I have found that perylene is formed when treating at an elevated temperature, preferably at about 130 to 160° C., 2,2'-dinaphthyl with anhydrous aluminium chloride with or without addition of an inert solvent such as chlorobenzene or chlorotoluene.

The following examples serve to illustrate my invention without limiting it, the parts being by weight:—

Example 1.—100 parts of 2,2'-dinaphthyl are heated for an hour together with 200 parts of anhydrous aluminium chloride at a temperature of 130 to 150° C. After cooling, the melt is decomposed by addition of water, boiled under addition of hydrochloric acid and filtered. The dried residue is then distilled under ordinary pressure. The fraction boiling higher than 450° contains the perylene formed. The distillation likewise may be carried out under reduced pressure. The perylene may be separated from the crude reaction product in a pure state by distillation with the aid of superheated steam of 300° C.

Example 2.—100 parts of 2,2'-dinaphthyl are boiled for 3 hours together with 200 parts of anhydrous aluminium chloride dissolved in 600 parts of chlorobenzene. Then the greater part of the solvent is distilled in vacuo, the residue is decomposed in the usual manner and the remaining part of the chlorobenzene is distilled with steam. The dried residue may be distilled as indicated in Example 1 or it is finely pulverized and digested for 3 hours at ordinary temperature with carbontetrachloride for removing the soluble resinous products. The remaining product is dissolved in hot xylene and filtered. After evaporating the solvent, crude perylene is obtained in a yield of 40 to 50 per cent. By recrystallization from xylene or toluene under addition of a decolorizing agent, perylene is obtained in a pure state melting at 265 to 266° C.

What I claim is:—

1. The process for manufacturing perylene which consists in treating 2,2'-dinaphthyl with anhydrous aluminium chloride at a temperature of about 130° to about 160° C.

2. The process for manufacturing perylene which consists in treating 2,2'-dinaphthyl with anhydrous aluminium chloride at a temperature of about 130° to about 160° C. in the presence of an inert solvent.

3. The process for manufacturing perylene which consists in treating 2,2'-dinaphthyl with anhydrous aluminium chloride at a temperature of about 130° to about 160° C. in the presence of a solvent of the group consisting of chlorobenzene and chlorotoluene.

FRIEDRICH KUHRMANN.